United States Patent [19]

Sakai et al.

[11] Patent Number: 4,475,609

[45] Date of Patent: Oct. 9, 1984

[54] DEVICE FOR GAUGING LARGE LOAD EXERTED ON STEEL STRUCTURE OR THE LIKE

[75] Inventors: Toshio Sakai, Toyonaka; Takehiro Matsui, Osaka; Akira Tanioka, Matsubara; Kohki Koyanagi, Asuka; Takaaki Ohkubo, Ibaraki; Tohru Hori, Nara; Yoshihiko Matsui, Osaka; Itsuo Kawagishi, Sakai; Masahiro Fujii, Kawachi-Nagano; Kohichi Yabe, Inagi; Haruhisa Yamashita, Hinode, all of Japan

[73] Assignee: Hitachi Shipbuilding & Engineering Co., Ltd., Japan

[21] Appl. No.: 385,449

[22] Filed: Jun. 7, 1982

[30] Foreign Application Priority Data

Aug. 17, 1981 [JP] Japan .............................. 56-127691
Mar. 9, 1982 [JP] Japan .............................. 57-35812

[51] Int. Cl.³ .......................... G01G 3/14; G01L 5/12
[52] U.S. Cl. .................................. 177/211; 73/862.65
[58] Field of Search ................. 177/211; 73/862.65, 73/862.55

[56] References Cited

U.S. PATENT DOCUMENTS 2,488,347 11/1949 Thurston ...................... 177/211 X
4,160,377 7/1979 Pechuk et al. .................. 73/862.65
4,423,793 1/1984 Caris ................................ 177/211

Primary Examiner—George H. Miller, Jr.
Attorney, Agent, or Firm—Barnes, Kisselle, Raisch, Choate, Whittemore & Hulbert

[57] ABSTRACT

A large-load gauging device comprising a load converter having strain gauges attached thereto at suitable locations on the inner and outer peripheries thereof, a load concentrating ring mounted on the load converter, a load dispersing plate mounted on the ring, and a load concentrating seat mounted on the dispersing plate.

With its setup as such, the gauging device provides an advantage of reduced height and weight as well as reduced cost and is able to perform accurate measurement of large loads.

10 Claims, 23 Drawing Figures

DEVICE FOR GAUGING LARGE LOAD EXERTED ON STEEL STRUCTURE OR THE LIKE

The present invention relates to a device for gauging large load exerted on a relatively flexible part of a structure composed of steel plates and reinforcing members (hereinafter referred to as "steel structure") or the like.

The expression "relatively flexible" as used herein means that such steel structure or the like is relatively readily flexible and deformable under load as compared with a rigid concrete or stone structure, for example, which is liable to break before it is deformed, when subjected to load.

An offshore drill rig with a vertically movable platform, known as jack-up rig, has vertically movable legs and carries thereon various drilling means. When in movement on the water surface, the rig has its legs jacked up and is in tow of a vessel, with the platform afloat under its own buoyancy. During drilling operation, the rig has its legs lowered down to the seabed, the platform being jacked up to a suitable level above the water surface. Being able to operate under stable working conditions, free from the influence of the waves and tidal current, it is largely used in submarine drilling operation, as a most advantageous apparatus from the standpoints of workability, safety, and economical efficiency.

It is essential with jack-up platforms that when lowering the legs to the seabed or when jacking up the platform to a level well above the water surface, close watch should be exercised to safeguard the rig against possible overturn as well as to place the rig in stable condition. To this end, it is a mandatory requirement that there must be provided guaging devices for measuring loads exerted on the individual legs (under the Department of Energy regulation, for example). Accordingly, the provision of such gauging is a priority requirement today especially with oil rigs and maintenance barges, and other jack-up platforms as employed in drilling operation in the North Sea area.

For the purpose of load gauging with respect to such apparatus as jack-up rig or the like, there is often employed a hydraulic load cell comprising a bag-like pad in which oil is encapsulated. The pad is disposed at a suitable spot on the path of load transmission and a load is measured on the basis of the hydraulic pressure in the pad. This type of load gauging device, however, has a disadvantage in that measurement errors due to oil temperature variation are likely to be exaggerated, it being difficult to compensate the temperature variation. Another difficulty with it is that when subjected to large load, the device is very likely to sustain damages due to stress concentration on its edge portions. Furthermore, the manufacture of such load cells involves some difficulty yet to be overcome.

In view of these difficulties with the conventional device, the present inventors attempted to employ a strain-gauge type load convertor in place of hydraulic load cell. However, this attempt encountered the following problem. For example, a jack-up rig is a steel structure in itself, and more particularly its ceiling or a support for a jack house that supports the dead load or a counterforce from legs is a steel structure or a relatively flexible part formed of steel plates or the like; as such, loads are not uniformly transmitted to load converters and this does not permit accurate load measurement.

In order to overcome this difficulty, an abutment plate formed of a highly rigid plate material may be interposed between a load converter and a particular part subject to load measurement of the structure, whereby accuracy of measurements may be improved. As will be hereinafter explained, however, this requires that the height of the jack house should be increased correspondingly to the thickness of such abutment plate, with the result of increased weight of the entire structure and increased material cost. Furthermore, it gives rise to a new problem that the arrangement is vulnerable to lateral load.

The present invention is intended to overcome these problems. Accordingly, it is the object of the invention to provide a gauging device which can accurately measure large load exerted on relatively flexible parts of a steel structure and the like and which is light in weight and inexpensive.

To this end, the invention provides a gauging device adapted for gauging large load exerted on a relatively flexible part of a steel structure or the like by being suitably disposed on the path of transmission of load, comprising a cylindrical load converter, said load converter having strain gauges attached thereto at suitable locations on the inner and outer peripheries thereof and adapted to convert loads on the load converter at both ends thereof into quantities of electricity, at least one load concentrating ring provided on the load converter at least at one end thereof, a load dispersing plate mounted to the load concentrating ring on the side thereof remote from said load converter, and a column-shaped load concentrating seat placed on the load dispersing plate on the side thereof remote from said load converter.

According to the above said arrangement, non-uniform loads exerted on a relatively flexible part subject to load measurement are concentrated upon said load concentrating seat, dispersed by means of the rigid load dispersing plate for some degree of load equalization, and then the so equalized loads are concentrated on said load concentrating ring, whereby the loads can be measured as uniform loads when they are transmitted to the pressure receiving surface of said load converter. As such, the gauging device according to the invention permits accurate measurement of large load exerted on steel structure or the like that has hitherto been regarded as being extremely difficult. Further, according to the invention, the process of load transmission consists of three stages, namely, concentration, dispersion, and concentration in that sequence, and therefore, substantial reduction in thickness can be achieved with respect to the individual transmitting members (load concentrating seat, load dispersing plate, and load concentrating ring). Not only does this mean reduced height, reduced weight, and lower cost, but also it does add to the stability of the device against lateral load.

Various features and advantages of the invention will be easily understood from the following description of embodiments with reference to the accompanying drawings, in which.

Figure 9:
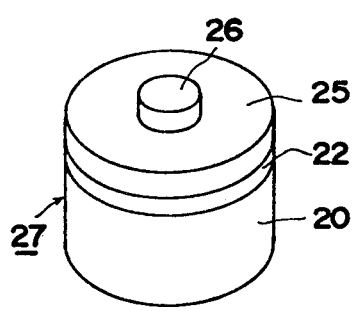
Figure 10:
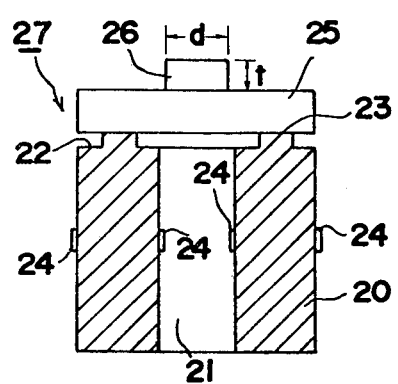
Figure 11:
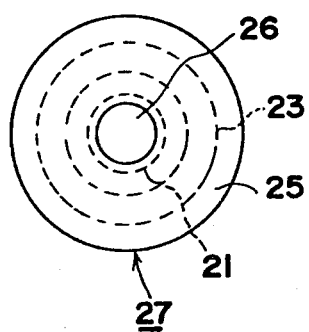
Figure 12:
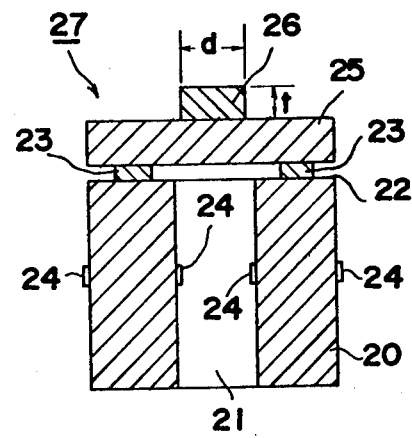
Figure 13:
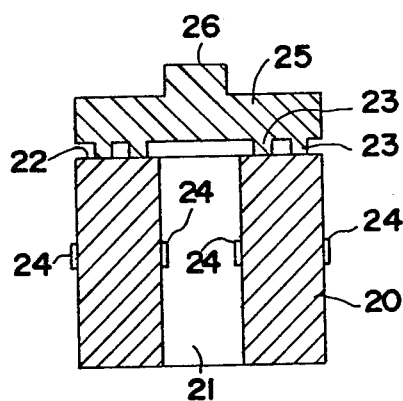
Figure 14:
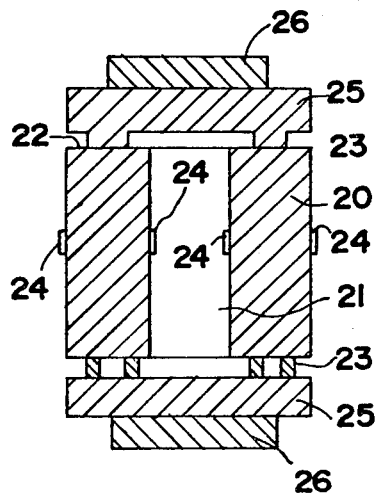
Figure 16:
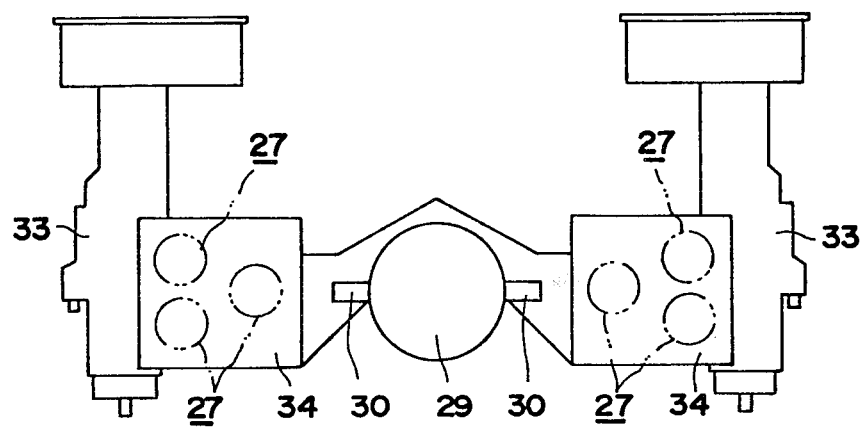
Figure 17:
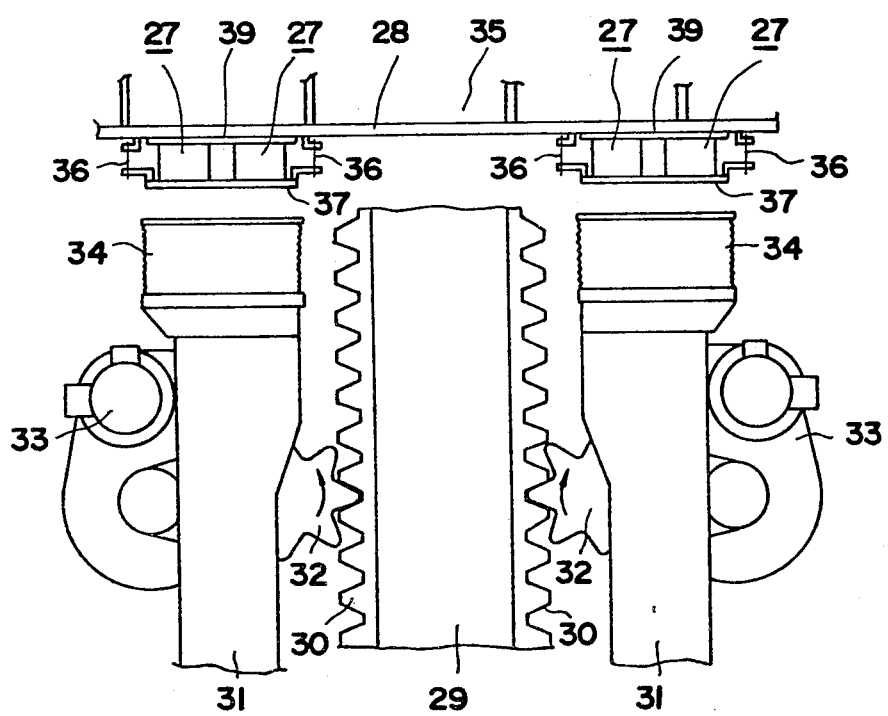

FIGS. 9, 10, and 11 are perspective, vertical sectional front, and top plan views respectively of a large-load gauging device representing a first embodiment of the present invention;

FIGS. 12, 13, and 14 are vertical sectional views in front elevational showing second, third, and fourth forms of large-load gauging device respectively according to the invention;

FIGS. 15a to 15d, inclusive, are illustrative views showing stress distribution at various different levels when the first form of large-load gauging device of the invention is subjected to load;

FIG. 16 is a plan view showing a jack-up platform arrangement in which large-load gauging devices according to the invention are employed;

FIG. 17 is a front view of the arrangement in FIG. 16; and

Figure 18:
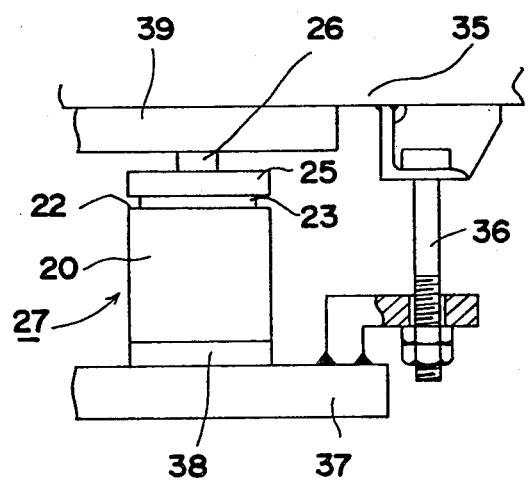

FIG. 18 is an enlarged fragmentary view in front elevation thereof.

In the drawings, like parts are designated by like reference numerals.

Before description is made of the embodiments of the present invention, construction of conventional large-load gauging device and problems found therewith are described in detail with reference to FIGS. 1 to 8, inclusive.

Figure 1:
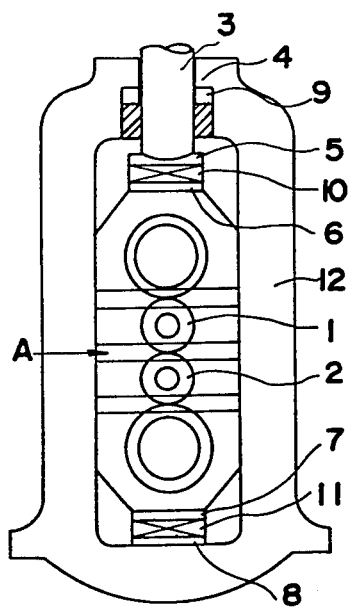
FIG. 1 is a front view of a rolling mill incorporating conventional load gauging devices.

FIG. 1 is a front view of a rolling mill incorporating conventional load converters with strain gauges. The rolling mill is such that a blank sheet is fed between two rollers 1 and 2, one disposed above the other, in the direction of arrow A for rolling to a predetermined gauge as adjusted by means of an adjust screw 3 provided at a higher level; loads exerted on individual supports 4, 5, 6, 7, and 8 during rolling operation are gauged by means of a washer-type load converters 9 and flat-type load converters 10, 11. In the rolling mill, a body 12 and the supports 4, 5, 6, 7, 8 individually abutting the load converters 9, 10, 11 are all of substantial rigidity so that possible deformation of the individual supports may be almost negligible, the supports being thus kept in parallelism with the load converters; therefore, loads exerted on the individual supports can be accurately measured.

Figure 2:
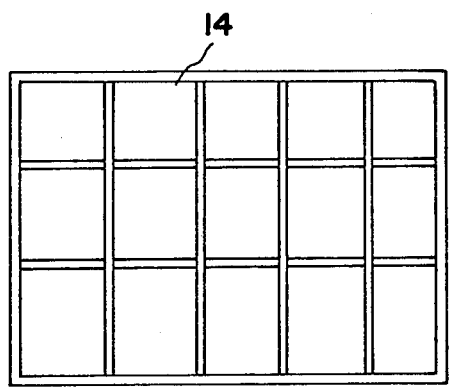
FIGS. 2 and 3 are top plan and front views respectively showing steel structures in no-load condition, with conventional load converters interposed therebetween.
Figure 3:
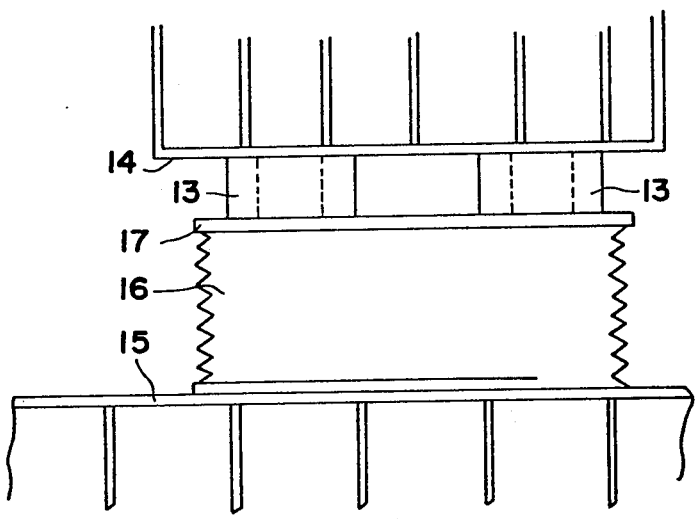

In the steel structure as shown in plan view and front elevation in FIGS. 2 and 3, however, upper and lower supports 14 and 15 which abut cylindrical load converters 13 are both of flexible and deformable steel structure. One of the upper and lower supports 14 and 15 is vertically movable toward and away from the other. There is provided a shock pad 16 for absorbing an impact which may be caused when one of the supports 14 and 15 moves close to the other. There is also provided a solid plate 17 for protecting the shock pad 16 against partial deformation.

Figure 4:
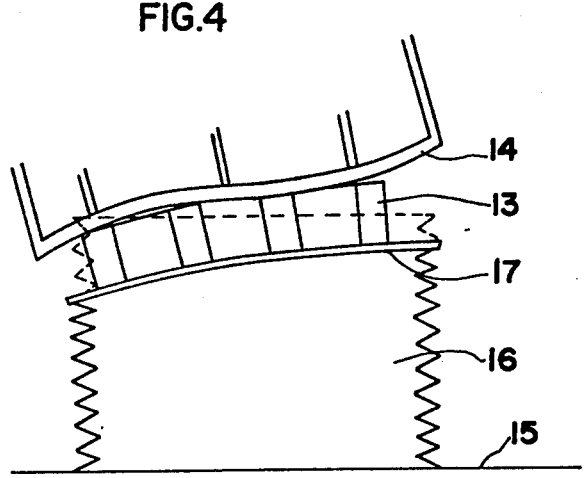
FIG. 4 is a view in front elevation of said steel structures as they appear when deformed under load.
Figure 5:
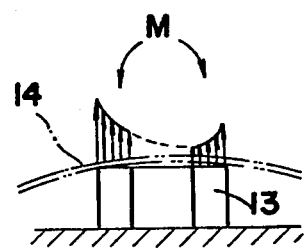
FIGS. 5 and 6 are illustrative views showing stress distribution over top ends of the load converters when the steel structures are under load.
Figure 6:
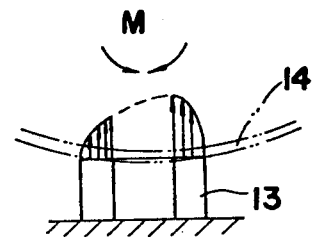

When such steel structure is subjected to load from below, for example, the solid plate 17 and upper support 14 are liable to the influence of diagonal and/or unevenly distributed load; and when disposed to diagonal and/or unevenly distributed load, though insignificant it may be, the upper support 14 and solid plate 17 deformed, and the surface of the load converter 13 which abuts the upper support 14 is also deformed, as FIG. 4 illustrates. For example, as FIG. 5 shows, if the bottom surface (indicated by two-dot chain lines) of the upper support 14 is bent upwardly, the stress distribution over the surface of the load converter 13 which is subjected to pressure will be such that the stress is largest on the outermost periphery, becoming smaller toward the innermost periphery. Conversely, if the bottom surface of the upper support 14 is bent downwardly, the stress distribution will be shown in FIG. 6. If unevenly distributed load is so exerted upon the pressure receiving surface of the load converter 13, the relation between the load and measured value thereof will be nonlineal; in the case of FIG. 5, the measured value of the load will likely be smaller than the actual value thereof, whereas is the case of FIG. 6, the measured value will likely be greater. In either case, no accurate measurement is expectable.

Figure 7A:
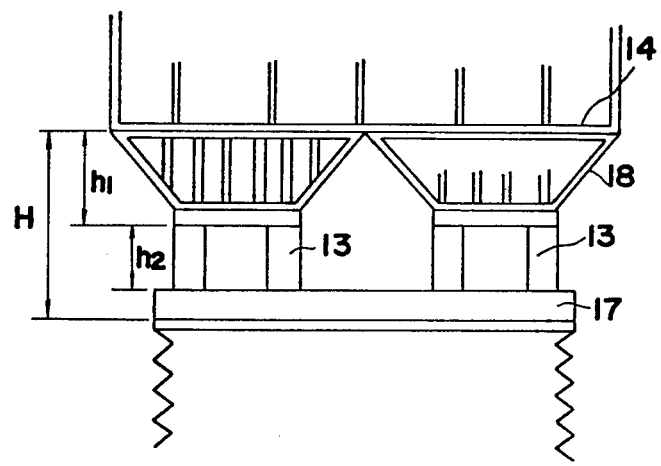
FIG. 7a is a front view of conventional load converters and known load equalizing means as arranged between steel structures.
Figure 7B:
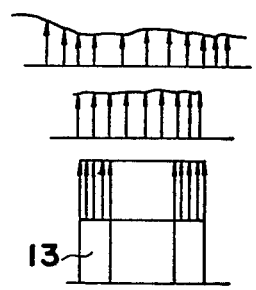
FIG. 7b is an illustrative view showing stress distribution at various different levels as in FIG. 7a arrangement.
Figure 8A:
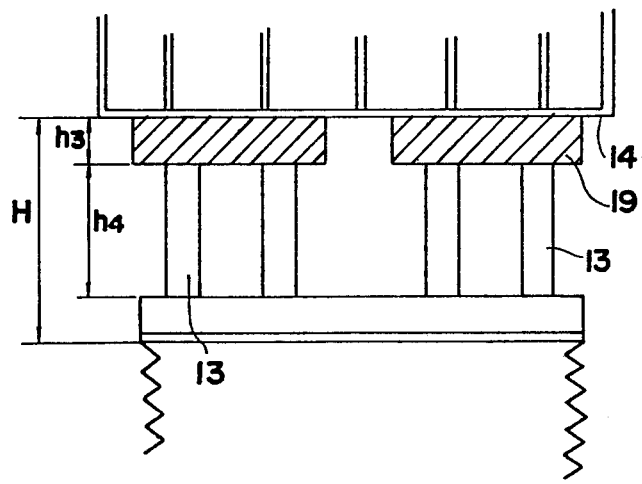
FIG. 8a is a view similar to FIG. 7a, showing an arrangement wherein known load equalizing means of another type are employed.
Figure 8B:
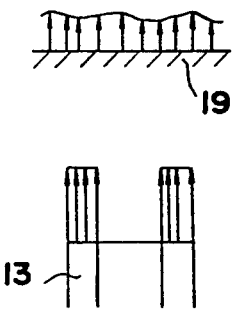
FIG. 8b is a view similar to FIG. 7b, showing stress distribution in FIG. 8a arrangement.

It has been found possible to overcome this difficulty by interposing between the top surface of the load converter 13 and the upper support 14 an abutment structure 18 having a height h1 for equalizing the distribution of the load, as illustrated in FIG. 7a, or by interposing an abutment plate 19 having a considerable thickness h3 and substantial rigidity and by increasing the height h4 of the load converter 13, as illustrated in FIG. 8a. The effect of said modifications is such that loads exerted on the pressure receiving surface of the load converter 13 are equalized, with stress distribution as illustrated in FIG. 7b (in the case of (FIG. 7a) or in FIG. 8b (in the case of FIG. 8a), the reproducibility or precision of load measurement being thus improved.

As can be observed from FIGS. 7a and 8a, however, if the height h1 of the abutment structure 18, height h3 of the abutment plate 19, and the height h4 of the load converter 13 are to function well for load equalizing purposes, the overall height H between the upper support 14 and the lower support 15 should naturally become larger accordingly; therefore, such modified arrangement involves not only increased weight and increased cost, but it poses a difficulty that the platform will become susceptible to the influence of lateral load.

The present invention provides a solution to this problem. By way of example, several embodiments, together with the effects thereof, will now be described with reference to FIGS. 9 to 15, inclusive. In FIGS. 9 to 11 showing a first embodiment of the invention, the numeral 20 indicates a load converter having a hollow interior space 21 and generally shaped like a cylinder, usually disposed upright. A load concentrating ring 23, integrally formed with the load converter 20, projects from the top end 22 of the latter. The ring 23 has an outer diameter smaller than that of the load converter 20 and an inner diameter larger than that of the latter. At suitable spots on the inner and outer peripheries thereof, the load converter 20 has a plurality of strain gauges 24 attached thereto by bonding or otherwise. The numeral 25 is a disc-shaped load dispersing plate mounted on the load concentrating ring 23. Shown at 26 is a cylindrical load concentrating seat which, integrally formed with the load dispersing plate 25, projects centrally from the top surface of the plate 25. The load converter 20, load concentrating ring 23, load dispersing plate 25, and load concentrating seat 26 are all concentrically arranged. The diameter d of the load concentrating seat 26 is preferably as small as possible to the extent that the material strength of a support member abutting the seat 26 permits (said support member, as an upper common abutting plate 39, to be described hereinafter). The thickness t of the seat 26 may be very small relative to the earlier mentioned h1, h3. In the present instance, the load concentrating seat 26 has a thickness of no more than 10 mm.

FIG. 12 shows a second embodiment of the invention, in which the load concentrating ring 23 is formed separately from the load converter 20 and load dispersing plate 25 and attached to them by bonding or mating. Similarly, the load concentrating seat 26 is formed as a separate structure and secured to the load dispersing plate 25 by bonding or mating.

A third embodiment shown in FIG. 13 differs from the first two embodiments only in that there are provided a couple of load concentrating rings. It is a matter of choice whether ring 23 or load concentrating seat 26 is formed as a separate structure.

As in a fourth embodiment shown in FIG. 14, load concentrating ring 23, load dispersing plate 25, and load concentrating seat 26 may be provided below the load converter in addition to those provided thereabove. In this case, at least the lower load concentrating seat 26 is formed relatively large for the sake of stability of a large-load gauging device 27.

Figure 15A:
Figure 15B:
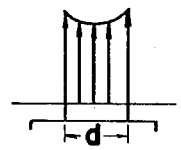
Figure 15C:
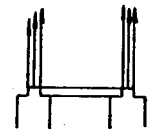
Figure 15D:
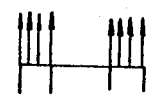

Set up as above described, the large-load gauging device 27, for example, the one shown in FIG. 10, is put in use in such a manner that the load converter 20 is placed on a base so that the load concentrating seat 26 supports a part under load. If the part under load which abuts the top surface of the load concentrating seat 26 is a relatively flexible part 28 such as steel structure, the part 28 will be deformed under load in a wavy pattern over its entire area, as FIG. 15a shows, and accordingly the stress distribution in the part 28 will be of a corresponding wavy pattern. The load concentrating seat 26 abutting the part 28 is subject to unevenly distributed load; therefore, the stress distribution over its surface is such that, as shown by way of example in FIG. 15b, the stress is relatively small in the center portion and greater as it extends toward the circumference. However, the unevenly distributed load exerted on the load concentrating seat 26 is concentrated by the seat 26, and this, coupled with the fact that the pressure receiving area of the seat 26 is small, prevents the bending moment due to the uneven distribution of load over the part 28 under load from extending to the load dispersing plate 25 and load converter 20. Furthermore, in the course of the transmission of load through the load dispersing plate 25 to the load concentrating ring 23, the stress in the load dispersing plate 25 is dispersed, and thus, as FIG. 15c illustrates, the stress distribution is substantially equalized when the pressure of the load reaches the top surface of the load concentrating ring 23. The load is further equalized by the load concentrating ring 23, and when it reaches the top end 22 of the load converter 20 through the load concentrating ring 23, the load has been uniformly distributed, and as FIG. 15d illustrates, the stress distribution is uniform over the entire surface of the load converter 20 subjected to pressure. This means that the integrated value of stress over the top end surface 22 of the load converter 20 agrees exactly with that in the part 28 under load as shown in FIG. 15a. Therefore, the load is properly transmitted to the strain gauges 24 attached to the load converter 20 so that an electrical output corresponding exactly to the load applied to the part 28 may be supplied by the strain gauges 24. According to the above described arrangement, the load concentrating seat 26, load dispersing plate 25, and load concentrating ring 23 may be of small thickness (or height), and the load converter 20 may be of low height and yet is able to perform load measurement with a very high degree of accuracy. This means reduced weight and reduced cost.

Referring next to FIGS. 16 and 18, there is shown by way of example a jack-up platform arrangement in which large-load gauging devices 27 in accordance with the invention are employed as already stated. The numeral 29 designates a leg having a pair of racks 30. Indicated by 31 is a support frame including pinions 32 which mesh with said racks 30. Pinion drive means are designated by 33. On the top of the support frame 31 there is mounted a shock pad 34. Three large-load gauging device 27, each through a rigid lower seat 38, are mounted on a lower common abutment plate 37 (a base) which is supported by a plurality of suspension bolts 36 from the bottom 28 (ceiling) of a jack house 35. A load concentrating seat 26 of each gauging device 27 is in abutment from below with an upper rigid abutment plate 39 secured to the ceiling 28 of the jack house 35. In the present instance, said upper rigid abutment plate 39 is interposed between the part 28 under load gauging and the load concentrating seat 26, but it may be dispensed with so that the load concentrating seat 26 is in direct contact with the part 28. Needless to say, the lower seat 38 may also be omitted.

The operation of the large-load gauging devices incorporated in such jack-up platform arrangement will now be explained.

To move the jack-up platform, the pinions 32 are rotated by means of the pinion drive means 33 in the directions as shown to move upward the racks 30 which mesh with the pinions 32, and the leg 29 integral with the racks 30. The platform, which floats by its own buoyancy, is then towed, as it is, to the target submarine oil field spot.

For submarine oil-well drilling (test drilling) operation, the pinion drive means 33 are run in the opposite direction from that shown to lower the legs 29 down to the seabed and then the platform is jacked up to a level well above the water surface. During this stage of operation, the support frame 31 is subjected to an upward load by reaction force of the pinions 32 which actuate the racks 30 to descend. The load is transmitted in the sequence of shock pad 34—lower common abutment plate 37—lower seat 38—load converter 20—load concentrating ring 23—load dispersing plate 25—load concentrating seat 26—upper common abutment plate 39—jack house 35 (ceiling 28), thus serving as a force for pushing up the platform. Interposed as such in the path of load transmission and formed of a combination of load converter 20, load concentrating ring 23, load dispersing plate 25, and load concentrating seat 26, the large-load gauging device 27 can measure accurately large loads exerted upon such a relatively flexible part as ceiling 28 of jack house 35 formed of steel structures (the weight of the platform being 4,000 t–20,000 t in the present instance). Thus, when jacking up the platform, for example, it is possible to monito the proportions of loads exerted upon the individual legs, thereby protecting the platform against the danger of overturn. For platform operation, it is particularly important that the legs should be allowed to adapt themselves to a soft submarine ground so as to maintain the platform in stable condition. For this purpose, as is often the case, sea water may be pumped into the platform to apply a heavy load to the legs; or one or two of the legs may be suspended so as to concentrate loads on the remaining legs. These operations must be performed with great care while strict watch being kept on the balancing of loads applied to the legs. The device according to the invention serves as very convenient gauzing means for use in such cases.

The example of application of the present invention as above described relates to a jack-up platform, but the present invention is not limited to use in jack-up platforms; it may of course be employed for large-load measurement purposes in overland and general construction oparations within the scope of the subject matter of the invention.

What is claimed is:

1. A gauging device adapted for gauging large load exerted on a relatively flexible part comprising a cylindrical load converter having strain gauges attached thereto at suitable locations on the inner and outer peripheries thereof and adapted to convert loads exerted on the load converter at both ends thereof into quantities of electricity, at least one load concentrating ring provided on the load converter at least at one end thereof and having an outer diameter smaller than the outer diameter of the load converter and an inner diameter larger than the inner diameter of the load converter, a discal load dispersing plate disposed on the load concentrating ring on the side thereof remote from the load converter and having a diameter larger than the outer diameter of the load concentrating ring, and a column-shaped load concentrating seat arranged on the load dispersing plate on the side thereof remote from the load converter and having a diameter smaller than the diameter of the load dispersing plate, said load concentrating ring, load dispersing plate and load concentrating seat all being disposed in the path of transmission of load to the load converter.

2. A gauging device as set forth in claim 1, wherein said load converter, said load concentrating ring, said load dispersing plate, and said concentrating seat are all arranged in concentrical relation to one another.

3. A gauging device as set forth in claim 1 or claim 2, wherein said load concentrating ring is formed integrally with said load converter, its end face being secured to said load dispersing plate by bonding or mating.

4. A gauging device as set forth in claim 1 or claim 2, wherein said load concentrating ring is formed as a separate member, being secured at one end thereof to the load converter and at the other end to the load dispersing plate by bonding or mating.

5. A gauging device as set forth in claim 1 or claim 2, wherein said load concentrating ring is formed integrally with the load dispensing plate, its end face being secured to the load converter by bonding or mating.

6. A gauging device as set forth in claim 1 or 2, wherein there are provided a plurality of load concentrating rings on said load converter at least at one end thereof.

7. A gauging device as set forth in claim 1 or 2, wherein there is provided at least one load concentrating ring on said load converter at each of the ends thereof.

8. A gauging device as set forth in claim 1 or 2, wherein the or each load concentrating seat is integrally formed with the or each load load dispersing plate.

9. A gauging device as set forth in claim 1 or 2, wherein the or each load concentrating seat is secured to the or each load dispersing plate by bonding or mating.

10. A gauging device as defined in claim 1 or 2 wherein the or each concentrating seat has a flat load receiving face on the side thereof remote from the load converter.

* * * * *